United States Patent
Lakshmanan et al.

(10) Patent No.: US 10,053,750 B2
(45) Date of Patent: Aug. 21, 2018

(54) RECOVERY OF NICKEL IN LEACHING OF LATERITE ORES

(71) Applicant: Process Research Ortech Inc., Mississauga (CA)

(72) Inventors: Vaikuntam I. Lakshmanan, Mississauga (CA); Ramamritham Sridhar, Oakvill (CA); Md. Abdul Halim, Mississauga (CA); Jonathan Chen, Toronto (CA); Robert J. DeLaat, Georgetown (CA)

(73) Assignee: PROCESS RESEARCH ORTECH INC. (CA)

( * ) Notice: Subject to any disclaimer, the term of this patent is extended or adjusted under 35 U.S.C. 154(b) by 310 days.

(21) Appl. No.: 14/225,639

(22) Filed: Mar. 26, 2014

(65) Prior Publication Data

US 2014/0294702 A1    Oct. 2, 2014

Related U.S. Application Data

(60) Provisional application No. 61/805,537, filed on Mar. 27, 2013.

(51) Int. Cl.
C22B 3/00    (2006.01)
C22B 3/30    (2006.01)

(52) U.S. Cl.
CPC ........ *C22B 23/0484* (2013.01); *C22B 3/0017* (2013.01); *C22B 23/0423* (2013.01); *Y02P 10/234* (2015.11)

(58) Field of Classification Search
None
See application file for complete search history.

(56) References Cited

U.S. PATENT DOCUMENTS

| | | | | |
|---|---|---|---|---|
| 4,193,969 A | * | 3/1980 | Fekete | C22B 3/0032 423/139 |
| 2004/0228783 A1 | * | 11/2004 | Harris | C22B 3/44 423/140 |

FOREIGN PATENT DOCUMENTS

| | | | |
|---|---|---|---|
| JP | 20116759 A1 | * | 2/1987 |
| JP | 06241721 A1 | * | 1/2011 |
| WO | WO200573416 A1 | * | 8/2005 |

* cited by examiner

*Primary Examiner* — Melissa S Swain
(74) *Attorney, Agent, or Firm* — Tarolli, Sundheim, Covell & Tummino LLP

(57) ABSTRACT

The invention provides a process for the leaching of a laterite ore or concentrate for the recovery of value metals, at least one value metal being nickel. The laterite ore or concentrate is subjected to a leaching step with a lixiviant comprising hydrochloric acid to leach nickel from the laterite ore. Nickel is extracted with an oxime at a lower pH than other processes for extraction of nickel from solution, especially after separation of iron and cobalt values.

11 Claims, 1 Drawing Sheet

RECOVERY OF NICKEL IN LEACHING OF LATERITE ORES

FIELD OF INVENTION

The present invention relates to a process for the extraction of nickel from laterite ores, especially in which the process is a mixed chloride leaching process. Nickel is extracted from solution obtained using an oxime. In particular, leach solution is subjected to a liquid/solids separation step followed by steps for separation of iron and of cobalt values, and free acid, following which raffinate obtained is subjected to extraction with an oxime to recover nickel values. The ores may be used as is or be reduced or calcined ores, and the leaching is preferably carried out with a lixiviant of hydrochloric acid and magnesium chloride.

BACKGROUND OF THE INVENTION

Nickel laterite ore bodies typically have a number of layers. For example, the ore body may have a layer of overburden with a low nickel content e.g. <0.8% nickel, which is usually discarded. Under the layer of overburden may be a limonite ore zone, a saprolite ore zone and then a layer of rock. It is to be understood that the thickness and the composition of the limonite and saprolite zones may vary widely between different ore bodies. As examples of the composition of the layers, the limonitic zone may contain about 1.2-1.7% nickel, about 40% iron and 1-4% magnesium oxide and the saprolitic zone may contain about 1.6-2.3% nickel and 7-25% iron.

Ores from the saprolitic zone are frequently treated using pyrometallurgical processes to recover ferronickel and a matte with 25-75% nickel content. Most of the ores from the saprolitic zone contain less than 20% iron, and the recovery of nickel from this zone may exceed 92%. More than 80% of the iron values are essentially lost in the slag. In some instances, ores from the limonitic zone are stockpiled, preference in recovery of nickel being given to the ores with higher nickel content found in saprolitic zones.

Processes have been developed for extraction of laterite ores using mixed chloride leach systems, especially solutions of hydrochloric acid and magnesium chloride. Processes have also been developed for removal of iron using ketone leaching and for separation of cobalt from solutions obtained in such processes. There is a need for processes to extract nickel and other value metals in mixed chloride leaching systems, especially on improvements in the leaching and recovery of nickel from solutions obtained in such processes.

SUMMARY OF THE INVENTION

In one aspect of the invention, the invention provides a process in which laterite ore or concentrate is subjected to a leach with a chloride-based lixiviant, especially a leach with a lixiviant of hydrochloric acid and magnesium chloride, followed by a liquid/solids separation step. The liquid is subjected to solvent extraction with an oxime to recover nickel values. In particular, the liquid is subjected to steps to separate iron and cobalt values and free acid from solutions obtained, followed by steps to recover nickel values.

Accordingly, the present invention provides a process for the separation of nickel from other metal values in acidic mixed chloride solution obtained from laterite ore, in which solution obtained therefrom is subjected to solvent extraction using an oxime to recover nickel values.

In a preferred embodiment of the process of the invention, the solution is subjected to solvent extraction for extraction of iron and cobalt values and free acid and raffinate so obtained is subjected to solvent extraction using an oxime to recover nickel values.

In another embodiment, the acidic mixed chloride solution is a hydrochloric acid solution. In particular, the acidic mixed chloride solution is a solution of hydrochloric acid and magnesium chloride.

In a particularly preferred embodiment, the oxime is 5,8-diethyl-7-hydroxy dodecan-6-one oxime.

The present invention also provides a process for the leaching of a laterite ore or concentrate for the recovery of value metals, such values including iron, cobalt and nickel, comprising the steps of:

a) subjecting laterite ore or concentrate to a leaching step with a lixiviant comprising hydrochloric acid and magnesium chloride to leach value metals from the laterite ore or concentrate, followed by a liquid/solids separation step to obtain a solution containing value metals;

b) subjecting the solution obtained in step (a) to solvent extraction with a ketone, to obtain a solution rich in iron and a raffinate;

c) subjecting raffinate obtained in step b) to solvent extraction with an amine for separation of cobalt;

d) subjecting raffinate obtained in step c) to solvent extraction with a phosphine oxide for extraction of free acid and value metals, said value metals including aluminum, chromium and manganese; and e) subjecting raffinate obtained in step d) to solvent extraction using an oxime to recover a solution rich in nickel.

In a preferred embodiment, the ketone is selected from the group consisting of methylisobutyl ketone, diisobutyl ketone and 2-tridecanone.

In another preferred embodiment, the oxime is 5,8-diethyl-7-hydroxy dodecan-6-one oxime.

In a further embodiment, prior to step (a), laterite ore has been subjected to a reductive roast or a calcining roast.

In another preferred embodiment, in step c), the raffinate is subjected to selective solvent extraction to recover cobalt, said solvent comprising at least one of a crown ether, phosphine acid oxide, phosphonic acid or ester thereof, or tertiary or quaternary ammonium salt.

BRIEF DESCRIPTION OF DRAWINGS

The present invention is illustrated by reference to the drawings, in which.

DETAILED DESCRIPTION OF THE INVENTION

Figure 1:
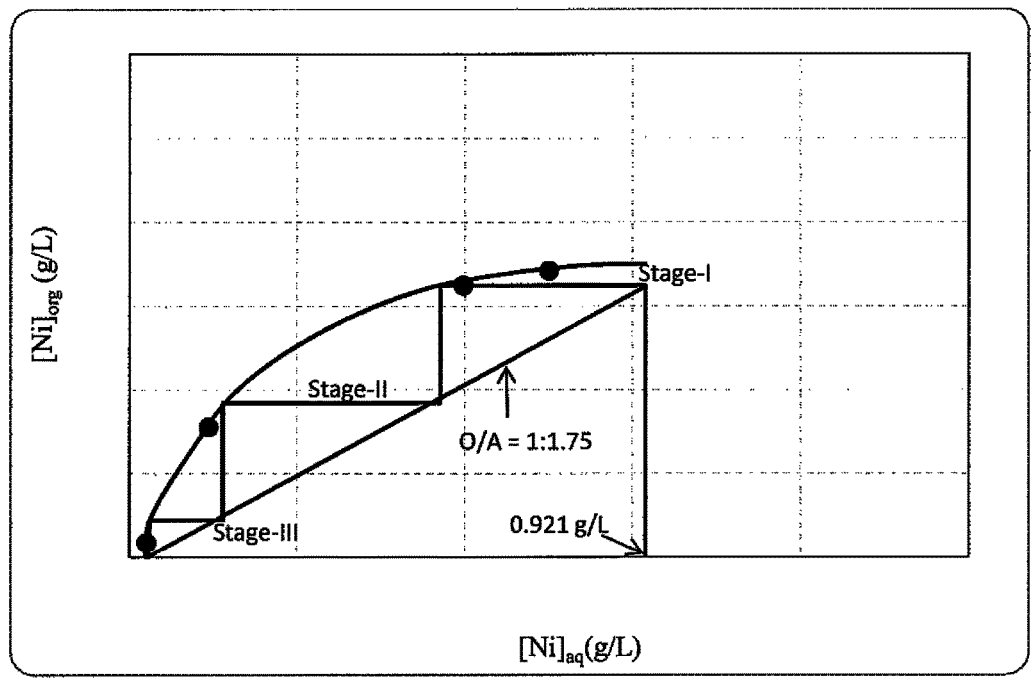
FIG. 1 is a representation of an isotherm of data of Example II.

A nickel laterite ore is a nickeliferous ore, and comprises nickel, iron, magnesium and silica. The ore may also contain other elements, for example, one or more of cobalt, manganese, zinc, copper, chromium and aluminum. As discussed above, nickel laterite ore bodies generally have a limonite ore zone with about 1.2-1.7% nickel, about 40% iron and 1-4% magnesium oxide and a saprolite ore zone with about 1.6-2.3% nickel and 7-25% iron. In existing commercial processes, the difference in nickel content results in hydrometallurgical processes generally being used for ore from limonitic zones and pyrometallurgical processes for ore from saprolite zones. Very few commercial processes utilize ore from both zones, since the lower nickel content material tends to be uneconomic for smelting processes, and the hydrometallurgical processes have been unable to handle significant values of magnesium.

The process of the present invention is able to treat chloride-based leach solutions obtained from the leaching of both limonite and saprolite zones discussed above, and therefore in preferred embodiments of the invention it is not necessary to discriminate between the zones in a laterite ore body.

The laterite ore may be a roasted ore, for instance a reduced or calcined ore. It is preferred that the ore be subjected to a physical up-grading or beneficiation step prior to any roasting process. Examples of methods for the physical up-grading of the ore, referred to herein as beneficiation, include by density, gravity, screening and washing. In particular embodiments of the invention, the ore subjected to roasting is in the form of a concentrate. The roasting may be a reduction roast or a calcination. The ore may be from one or both of the limonitic zone and saprolitic zone ores described above, or the ore or concentrate may be from other sources, for example obtained from another process, e.g. ore or concentrate that has been rejected as not suitable for processing in a process not of the invention. Other sources of laterite ore may also be used. It is understood that the ore may be a concentrate, tailing or waste rock. The ore may be subjected to a physical up-grading or separation or other beneficiation step to form a concentrate if the ore is not in a suitably concentrated form, as is known. Steps may be taken to remove chromium, especially in the form of chromites, prior to leaching. Such separation of chromites in this step would be expected to facilitate the separation and recovery of nickel and other value metals in subsequent steps in the process.

In a mixed chloride leach system, the ore is subjected to a hydrochloric acid leach, most preferably with a lixiviant of hydrochloric acid and magnesium chloride. The leaching may be conducted as a co-current step, a countercurrent step or in another manner, and is most conveniently carried out at atmospheric (ambient) pressure. It is not necessary to conduct the leaching step under pressure. The leaching step is preferably carried out with a magnesium chloride concentration of at least 100 g/L and with hydrochloric acid having a maximum concentration of 18% (mass ratio). In embodiments, the concentration of hydrochloric acid is at least 12% and especially in the range of 14-18% (mass ratio). The chloride concentration is most preferably in the range of 50-400 g/L, and especially 200-300 g/L. The Mg/HCl (magnesium to hydrochloric acid) ratio expressed in terms of mass percentage (m/m) in the leach is preferably adjusted to optimize the leach, based on for example the particular ore being leached and temperature. The Mg/HCl ratio in the lixiviant is generally in the range of 0.1-2.0, especially 0.4-1.0. Laterite ores contain magnesium oxide, and part or all of the magnesium chloride in the lixiviant may be formed by reaction of HCl in the lixiviant with magnesium oxide in the ore.

The leach is preferably carried out at a temperature in the range of 40° C. up 105° C. The leach is a highly acidic leach i.e. carried out at a low pH. A liquid/solids separation is preferably then carried out, in which the leached slurry is fed to a solid/liquid separation step to effect separation of leachate from solids. Techniques for such separation are known e.g. using a pressure or vacuum filter, counter-current decantation or centrifuge. The liquid thus obtained is subjected to steps to separate nickel and other valuable metals from the solution, as described herein. In addition to iron, nickel and cobalt, the value metals may also include aluminum, manganese and precious group metals (PGMs).

The present invention is particularly directed to the use of an oxime in the recovery of nickel from solutions obtained in the process. In particular, the present invention is directed to the use of 5,8-diethyl-7-hydroxy dodecan-7-one oxime as the oxime in the recovery of nickel. The use of the oxime permits the recovery of nickel at a lower pH of 0.5-2.5, compared to other processes that operate at a pH of 5-6. Preferably, the pregnant liquid obtained from the leaching step is subjected to steps to recover iron values therefrom followed by steps to recover other metal values, especially cobalt. Raffinate obtained from a free acid extraction step is subjected to extraction with the oxime to recover nickel values.

In an embodiment, the leachate obtained from the above solids/liquid separation steps is subjected to a step to separate iron values in the leachate from cobalt and nickel, and other value metals. The preferred method of recovery of nickel and cobalt, and separation from iron, from the leachate uses solvent extraction. Preferably, a sequence of solvent extraction steps is used, to extract iron, cobalt, free acid and then nickel in sequence. For separation of iron, the leachate is subjected to solvent extraction with an alkyl ketone, especially a dialkyl ketone. In particular, the alkyl groups of the dialkyl ketone may be $C_1$-$C_6$ alkyl groups, especially $C_1$-$C_4$ alkyl groups, examples of which are methyl, ethyl, propyl and butyl including isopropyl and isobutyl. The ketone may also be 2-tridecanone. Preferred ketones are methylisobutylketone (MIBK) and diisobutylketone (DIBK) and 2-tridecanone. The dialkyl ketone is preferably mixed with a diluent and a modifier. Examples of the diluent are organic phase diluents, for instance kerosenes e.g. CF-231 kerosene. Examples of the modifier are alcohol surfactants e.g. EXXAL™ 13 tridecylalcohol. In an embodiment, methylisobutyl ketone is used in a ratio of 5/10/85 of MIBK/EXXAL™ 13 tridecyl alcohol/CF-231 kerosene. Iron is stripped from the loaded organic solution obtained e.g. by addition of water, and may be recovered by pyrohydrolysis to give $Fe_2O_3$ which may be offered for sale. The raffinate from iron pyrohydrolysis contains hydrochloric acid which may be recycled to the leaching step.

It is preferred that all solvent extractions discussed herein be carried out in a multi-step process i.e. raffinate from a first solvent extraction is subjected to further solvent extraction, followed by separation of solvent from raffinate. Such steps may be repeated a number of times.

The solvent extraction using ketone separates iron values, in the form of ferric iron, from the leachate of the leach solution. The remaining liquid (raffinate) contains cobalt, nickel and other metal values, as well as lixiviant i.e. hydrochloric acid and magnesium chloride if the lixiviant is hydrochloric acid/magnesium chloride, and steps may be taken to recover such metal values. In particular, it is preferred that steps be taken to separate cobalt then free acid from the raffinate using solvent extraction, and subsequently that steps be taken to separate nickel from the raffinate thus obtained.

Examples of the solvents for selective separation of cobalt from hydrochloric acid solution include crown ethers, phosphine acid oxide, phosphonic acid or esters e.g. trialkyl phosphine oxide (Cyanex™ 923) and his (2,4,4 trimethyl pentyl) phosphinic acid (Cyanex™ 272), or tertiary or quaternary ammonium salt (Alamine™ 336 water-soluble trioctyl/decyl amine), which can be used individually or in combination. Trialkyl phosphine oxide (Cyanex™ 923) can also be used to extract free acid. As discussed below, Alamine™ 336 is a preferred reagent for solvent extraction of cobalt and Cyanex™ 272 is a preferred reagent for solvent extraction of nickel or a combination of phosphine acid oxide and a quaternary ammonium salt (Alamine™ 336 water soluble trioctyl/decyl amine.

The present invention particularly relates to the use of an oxime to recover nickel from a solution obtained from a mixed chloride leaching process. It is preferred that the solution be a raffinate obtained subsequent to removal of iron, cobalt and free acid from solutions of the process. A particular oxime for the extraction of nickel is 5,8-diethyl-7-hydroxy dodecan-6-one oxime, which is available as LIX 63. Such an oxime has improved stability in the extraction step described herein. The oxime is also an effective extraction agent, as illustrated in the examples. The oxime is preferably mixed with a diluent and a modifier. Examples of the diluent are organic phase diluents, for instance kerosenes e.g. Exxsol™ D80 de-aromatized aliphatic solvent. Examples of the modifier are alcohol surfactants e.g. EXXAL™ 13 tridecylalcohol. In an embodiment, oxime is used in a ratio of 5/10/85 of oxime/EXXAL™ 13 tridecyl alcohol/Exxsol™ D80. Ratios are also shown in the examples. Solvent extraction using oxime may be carried out at room temperature or at elevated temperatures, as illustrated in the examples. Extraction is also carried out under acid conditions. Such use of acid conditions is a particularly important aspect of the present invention, and provides significant advantages to the process of the present invention, in particular with respect to recycling in the process. If the recovery of nickel had to be carried out more alkaline conditions e.g. by formation of hydroxides, it would be necessary to add for instance lime to raise the pH, resulting in the need for liquid/solid separations, and the potential for unwanted by-products, e.g. so-called crud, in the precipitated hydroxides that would be obtained.

The solids from the liquid/solids separation step after the hydrochloric acid leach may be subjected to steps to recover values metals therein. In particular, the solids will contain any precious group metals (PGMs) and gold in the laterite ore; the relatively mild conditions of leaching in the present invention are not expected to be conducive to the leaching of PGMs. Techniques for the recovery of PGMs and gold are known.

Some laterite ores are known to contain chromium, especially chromium in the form of chromite. Any chromium in the ore is expected to be separated as part of the solids in the liquid/solids separation step, and may be recovered therefrom. As noted above, chromite may also be separated in the physical separation step discussed above.

A particular advantage of the process described herein, and its embodiments, is that high rates of extraction of value metals are obtained in a leaching step that operates at atmospheric pressure. In addition, iron is separated from other value metals by solvent extraction, thereby lessening or eliminating subsequent process difficulties in recovery of, in particular, cobalt and nickel with low levels of contamination by iron. The use of atmospheric pressure results in substantial economic advantages, especially in capital costs. Value metals may be recovered. The use of chloride chemistry offers advantages in operating and capital costs of the process. Leaching agent is regenerated and recycled, especially using a pyrohydrolysis step with additional hydrochloric acid being formed from chlorine if required. Magnesium chloride may be recycled to the leaching step. The use of oxime in the recovery of nickel, especially subsequent to separation of iron and then cobalt, is effective in the recovery of the nickel. The oxime, especially the preferred oxime, exhibits greater stability under the process conditions than other reagents for the solvent extraction of nickel from mixed chloride solutions. It also facilitates recycle of components and eliminates formation of hydroxides and problems associated therewith in recovery of nickel.

The present invention is illustrated by the following examples.

Example I

A sample of a laterite ore was leached with a lixiviant of hydrochloric acid and magnesium chloride. After the leach, the leach solution was subjected to a liquid/solids separation step. The liquid obtained was analyzed and found to have the following composition, reported in mg/L:

| Fe: 44600 | Co: 64.4 | Ni: 1050 | Al: 1900 |
| Ca: 2460 | Cr: 2080 | Mg: 55680 | Mn: 691 |

The liquid from the liquid/solids separation step was subjected to a multi-step solvent extraction with diisobutyl ketone (DIBK) solution. The solution used was 20% DIBK, 60% Exxal™ 13 tridecyl alcohol and 20% CF 231 organic diluent. In each step, the liquid was subjected to solvent extraction with the DIBK solution for a period of at least 5 minutes at room temperature, after which the DIBK solution was separated, to give a pregnant strip liquor solution of DIBK and a raffinate. The solvent extraction was then repeated on the raffinate. The solvent extraction procedure was repeated four times. In each step, the ratio of organic: aqueous liquid was 1:1. The resulting raffinate had the following composition, in mg/L:

| Fe: 159 | Co: 56.9 | Ni: 958 | Al: 1310 |
| Ca: 3320 | Cr: 1820 | Mg: 57100 | Mn: 561 |

This step had reduced the amount of iron in the raffinate to a low level. In another embodiment, the pregnant leach solution was subjected to extraction of iron with 2-decanone. The solution used was 20% 2-decanone, 60% EXXAL™ 13 tridecyl alcohol and 20% Exxsol™ D80 organic solvent. The solvent extraction procedure was repeated three times. In each step, the extraction process was carried out for 5 minutes at room temperature at an organic: aqueous ratio of 1:1. The results obtained were:

| Metal (mg/L) | Feed | Raffinate |
|---|---|---|
| Fe | 48980 | 13380 |
| Co | 97.4 | 100 |
| Ni | 940.7 | 943.9 |

The raffinate thus obtained was subjected to multi-step solvent extraction to reduce the amount of cobalt in the raffinate. The solution used was 5% Alamine™ 336, 5% Exxal™ 13 tridecyl alcohol and 90% CF 231 organic diluent. In each step, the liquid was subjected to solvent extraction with the Alamine™ 336 solution for a period of at least 5 minutes at room temperature, after which the Alamine™ 336 solution was separated, to give a pregnant strip liquor solution of Alamine™ 336 and a raffinate. The solvent extraction was then repeated on the raffinate. The solvent extraction procedure was repeated four times. In each step, the ratio of organic:aqueous liquid was 1:1. The resulting raffinate had the following composition, in mg/L:

| Fe: <0.01 | Co: 3.9 | Ni: 958 | Al: 1300 |
|---|---|---|---|
| Ca: 3370 | Cr: 1810 | Mg: 55600 | Mn: 462 |

This step had reduced the level cobalt to a low level and reduced the level of iron below the level of detection in the analysis.

Example II

The procedure of Example I was repeated using different sample of laterite ore to obtain numerous raffinate solution that had had the levels of iron and cobalt therein reduced to low levels. Samples of such raffinates were subjected to extraction of free acid using a solution of 50% Cyanex™ 923, 10% EXXAL™ 13 and 40% Exxsol™ D80 de-aromatized aliphatic solvent. During the free acid extraction, some metals including Al, Cr and Mn were co-extracted. The solvent extraction procedure was repeated three times, each extraction step being carried out at room temperature for 5 minutes. In each step, the ratio of organic:aqueous liquid was 1:1. The resulting raffinate had the following composition:

|  | Feed | Raffinate |
|---|---|---|
| Ni | 1138 | 1094 |
| Al | 1321 | <5 |
| Ca | 3465 | 3500 |
| Cr | 1784 | 93 |
| Mg | 51490 | 52250 |
| Mn | 506.8 | <5 |
| Free acid | 0.85N | — |
| pH | — | 2.3 |

Samples of the above raffinates were subjected to solvent extraction using a solution of 10% 5,8-diethyl-7-hydroxy dodecan-6-one oxime, 5% EXXAL™ 13 and 85% Exxsol™ D80 de-aromatized aliphatic solvent. The solvent extraction was carried out at room temperature for 5 minutes. Each extraction was repeated for a total of five times. The resulting raffinates had the following composition, in mg/L, with the composition prior to extraction being given in brackets. Runs 1 and 2 the free acid is reported as N, and in Runs 3 and 4 the free acid is reported as pH:

| Run | 1 | 2 | 3 | 4 |
|---|---|---|---|---|
| Ni | 832 (1138) | 360 (1002) | 178 (1014) | 155.7 (1094) |
| Al | 1334 (1321) | 1289 (1354) | 962 (983) | <5 (<5) |
| Ca | 3486 (3465) | 3589 (3558) | 3495 (3551) | 3500 (3480) |
| Cr | 1790 (1784) | 1756 (1844) | 1679 (1716) | 92 (93) |
| Mg | 51540 (51490) | 53740 (54440) | 54130 (53240) | 52340 (52250) |
| Mn | 505.9 (506.8) | 94.7 (94.8) | 36 (29.4) | <5 (<5) |
| Free Acid | 0.84 (0.85) | 0.36 (0.32) | 1.1 (1.0) | 2.2 (2.3) |
| Ext. % | 27 | 64 | 82 | 86 |

An important aspect of the present invention is that nickel may be extracted at a lower pH than other extraction processes.

A nickel extraction isotherm with an organic solution of 10% 5,8-diethyl-7-hydroxy dodecan-6-one oxime, 5% EXXAL™ 13 and 85% Exxsol™ D80 is shown in FIG. 1.

Example III

The loaded organic (10% 5,8-diethyl-7-hydroxy dodecan-6-one oxime, 5% EXXAL™ 13 and 85% Exxsol™ D80) of Example II was subjected to nickel strip using different hydrochloric acid concentrations, at different temperatures. The extraction solvent was 10% of LIX 63, 5% of EXXAL™ 13 and 85% of Exxsol™ D80. Further details are below. RT is room temperature and as above data prior to the stripping as shown in brackets. The results obtained, including extraction expressed as a percentage, were as follows:

| Run | HCl (N) | Temp. (° C.) | Ni (mg/L) | Strip (%) |
|---|---|---|---|---|
| 5 | 0.1 | 45 | 633.5 (808) | 78 |
| 6 | 0.1 | RT | 408.7 (808) | 51 |
| 7 | 0.05 | 45 | 504.4 (808) | 62 |
| 8 | 0.05 | RT | 292.2 (808) | 36 |
| 9 | 1 | 45 | 1003 (1180.9) | 85 |
| 10 | 1 | RT | 267.8 (1180.9) | 23 |

This example shows that high levels of extraction of nickel may be obtained.

Example IV

Figure 2:
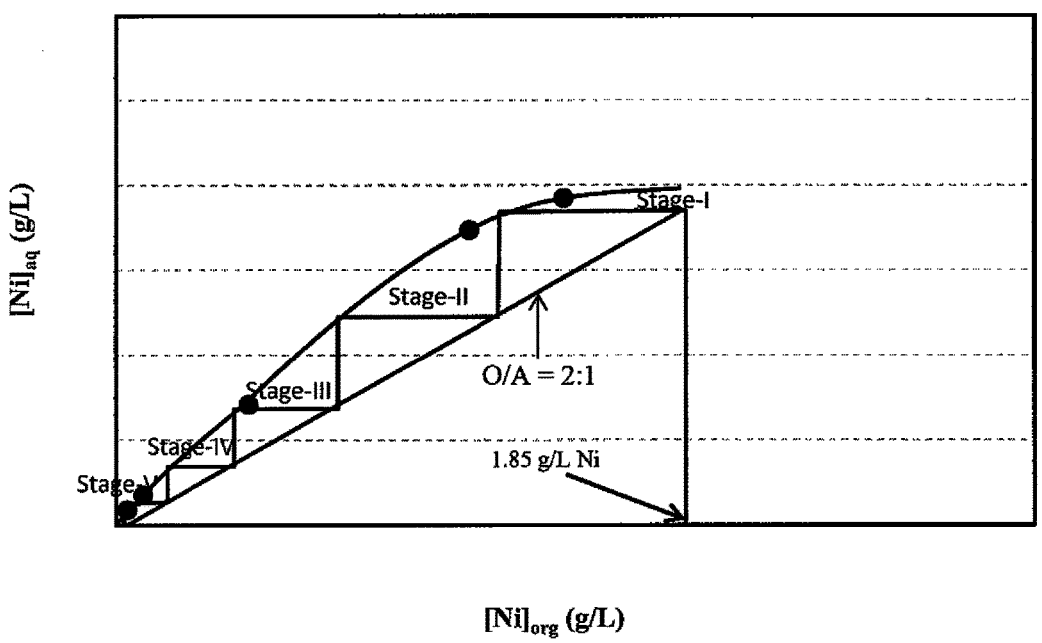
FIG. 2 is a representation of an isotherm of data of Example IV.

Tests were conducted to assess the isotherm for the stripping process. A sample of raffinate obtained after extraction of free acid was subjected to nickel extraction using an organic solution of 5,8-diethyl-7-hydroxy dodecan-6-one oxime (10%), EXXAL™ 13 (5%) and D80 (10%). The loaded organic solution was subjected to nickel strip with 0.1N HCl and at 40-45° C. at different organic:aqueous phase ratios. The nickel stripping isotherm is shown in FIG. 2. This example provides information for the preparation of an isotherm for nickel stripping.

The invention claimed is:

1. A process for separation of nickel from other metal values in acidic mixed chloride solution obtained from extraction of laterite ore, the acidic mixed chloride solution being a hydrochloric acid solution in which a solution from the extraction of laterite ore is subjected to solvent extraction for extraction of iron values, and raffinate so obtained is subjected to solvent extraction using an oxime as the sole extractant at a pH in the range of 0.5 to 1.5 to recover nickel values.

2. The process of claim 1 in which, prior to the solvent extraction with oxime, the raffinate from the extraction of iron is, in sequence, (i) subjected to solvent extraction for extraction of cobalt values, and (ii) subjected to solvent extraction for extraction of free acid, raffinate obtained from the extraction in (ii) is, in sequence, being subjected to the solvent extraction using an oxime as the sole extractant to recover nickel values.

3. The process of claim 1 in which the acidic mixed chloride solution is a solution of hydrochloric acid and magnesium chloride.

4. The process of claim 1 in which the oxime is 5,8-diethyl-7-hydroxy dodecan-6-one oxime.

5. A process for the leaching of a laterite ore or concentrate for recovery of value metals, such values including iron, cobalt and nickel, comprising the steps of:

a) subjecting laterite ore or concentrate to a leaching step with a lixiviant comprising hydrochloric acid and magnesium chloride to leach value metals from the laterite ore or concentrate, followed by a liquid/solids separation step to obtain a solution containing value metals;

b) subjecting the solution obtained in step (a) to solvent extraction with a ketone, to obtain a solution rich in iron and a raffinate;

c) subjecting raffinate obtained in step b) to solvent extraction for separation of cobalt;

d) subjecting raffinate obtained in step c) to solvent extraction with a phosphine oxide for extraction of free acid and value metals selected from the group consisting of aluminum, chromium and manganese; and e) subjecting raffinate obtained in step c) to solvent extraction using an oxime as the sole extractant at a pH in the range of 0.5 to 1.5 to recover a solution rich in nickel.

6. The process of claim 5 in which the ketone is selected from the group consisting of methylisobutyl ketone, diisobutyl ketone and 2-tridecanone.

7. The process of claim 5 in which the oxime is 5,8-diethyl-7-hydroxy dodecan-6-one oxime.

8. The process of claim 5 in which, prior to step (a), laterite ore has been subjected to a reductive roast or a calcining roast.

9. The process of claim 5 in which, in step c), the raffinate obtained in step (b) is subjected to selective solvent extraction to recover cobalt, said solvent for extraction of cobalt comprising at least one of a crown ether, phosphine acid oxide, phosphonic acid or ester thereof, or tertiary or quaternary ammonium salt.

10. The process of claim 5 in which in step (c) the raffinate obtained in step (b) is subjected to solvent extraction using water soluble trioctyl/decyl amine.

11. The process of claim 5 in which in step d) the phosphine oxide is trialkyl phosphine oxide.

* * * * *